M. C. SMITH.
Bale-Tie.

No. 206,362.    Patented July 23, 1878.

Witnesses;
E. S. Lenox
Edwin E. Moore

Inventor;
Moses C. Smith,
By his Attorney,
Thos. H. Dodge

UNITED STATES PATENT OFFICE.

MOSES C. SMITH, OF STARKVILLE, ASSIGNOR TO EDWIN S. LENOX, OF NEW YORK, N. Y.

IMPROVEMENT IN BALE-TIES.

Specification forming part of Letters Patent No. 206,362, dated July 23, 1878; application filed December 10, 1877.

*To all whom it may concern:*

Be it known that I, MOSES C. SMITH, of Starkville, in the county of Herkimer and State of New York, have invented certain new and useful Improvements in Wire Bale-Ties for Baling Hay and other similar substances; and I do hereby declare that the following is a full, clear, and exact description of the same, reference being had to the accompanying drawings, forming a part of this specification, and in which—

Figure 1:
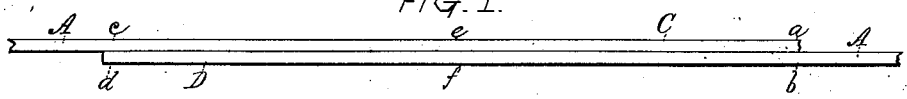
Figure 2:
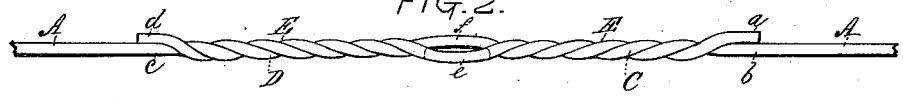

Figure 1 represents a view of the two ends of a wire bale-tie before being united to clasp and hold the bale, as will be hereinafter more fully explained; and Fig. 2 represents the same parts after they have been united to clasp and hold the bale, as hereinafter described.

To enable those skilled in the art to which my invention belongs to make and use the same, I will proceed to describe it more in detail.

In the drawings, the parts marked A represent portions of the body of a wire bale-tie sufficient to illustrate my present invention, and the parts marked C D represent the ends of such bale-tie lapped together, as they appear after the tie has been placed about the bale, preparatory to being united together in a strong and secure manner, as shown at E E, Fig. 2 of the drawings.

The ends C D are interlocked and twisted together, as shown in Fig. 2, as follows: After the bale has been subjected to the desired pressure in the press, the bale-wires are passed around the bale in its compressed state, one after the other, and the ends of each bale-wire are then secured or fastened together by first lapping the ends and then passing the lapped ends at the points *a b* and *c d* into slots in stationary arms, which hold the wire laps at these points from turning while the lapped ends at the points *e f* are passed into a slotted gear, after which said slotted gear is rotated a few times, thereby forming two twisted or interlocking portions, E E, one on each side of the points *e f*, as fully indicated in Fig. 2 of the drawings, thereby securing the ends of the bale-tie together and about the bale before the latter is removed from the press in a very secure and expeditious manner. The mechanism for performing the operation having been fully described in Letters Patent granted to me June 6, 1876, no further detailed description thereof is necessary.

It will be seen that the wire does not require any previous manipulation or preparation, excepting to be cut into proper lengths previous to its being used in the press; and, if preferred, the wire could be taken directly from a reel and cut off after being drawn about the bale.

It will be observed that the bale-tie is a very efficient one, while its construction is comparatively simple and free from liability of being broken or displaced from the bale during handling or shipment of the latter.

I am aware that Letters Patent were granted to A. J. Williams, September 11, 1849, for improvement in heddle-machines; also, that Letters Patent were granted to Charles W. Goodhue, dated July 25, 1871, for improvement in wire blanks for napkin-rings, cruet-holders, &c.; and I hereby disclaim the inventions and improvements described and shown in both and each of said Letters Patent; but, Having described my improvement in wire bale-ties, what I claim therein as new and of my invention, and desire to secure by Letters Patent, is—

1. The herein-described bale-tie A, having its ends C D twisted and locked together, substantially in the manner and for the purpose specified.

2. The mode or process of securing wire bale-ties about bales of hay or other similar substances while in the press, substantially as shown and described.

MOSES C. SMITH.

Witnesses:
   EDW. S. LENOX,
   GEORGE E. PHILLIPS.